United States Patent
Durante Spigolon et al.

(10) Patent No.: US 12,406,439 B2
(45) Date of Patent: Sep. 2, 2025

(54) DIGITAL OUTCROP MODEL RECONSTRUCTING METHOD

(71) Applicants: PETRÓLEO BRASILEIRO S.A.—PETROBRAS, Rio de Janeiro (BR); UNIVERSIDADE DO VALE DO RIO DOS SINOS—UNISINOS, São Leopoldo (BR)

(72) Inventors: Andre Luiz Durante Spigolon, Rio de Janeiro (BR); Luiz Gonzaga Da Silveira, Jr., São Leopoldo (BR); Caroline Lessio Cazarin, Rio de Janeiro (BR); Leonardo Bachi, São Leopoldo (BR); Mauricio Roberto Veronez, São Leopoldo (BR)

(73) Assignees: PETRÓLEO BRASILEIRO S.A.—PETROBRAS, Rio de Janeiro (BR); UNIVERSIDADE DO VALE DO RIO DOSSINOS—UNISINOS, São Leopoldo (BR)

( * ) Notice: Subject to any disclaimer, the term of this patent is extended or adjusted under 35 U.S.C. 154(b) by 147 days.

(21) Appl. No.: 18/521,656

(22) Filed: Nov. 28, 2023

(65) Prior Publication Data
US 2024/0177422 A1    May 30, 2024

(30) Foreign Application Priority Data
Nov. 29, 2022    (BR) .................... BR 1020220244014

(51) Int. Cl.
*G06T 17/20*    (2006.01)
*G06T 3/4023*    (2024.01)
(Continued)

(52) U.S. Cl.
CPC .......... *G06T 17/205* (2013.01); *G06T 3/4023* (2013.01); *G06T 7/10* (2017.01); *G06V 10/24* (2022.01); *G06T 2207/20212* (2013.01)

(58) Field of Classification Search
CPC ....... G06T 17/205; G06T 7/10; G06T 3/4023; G06T 2207/20212; G06V 10/24
(Continued)

(56) References Cited

U.S. PATENT DOCUMENTS 11,508,042 B1 * 11/2022 Knuffman ................. G06T 5/60
11,694,394 B2 *  7/2023 Cao ......................... G06T 17/00
                                                         345/419

(Continued)

FOREIGN PATENT DOCUMENTS

CN    110009740 A    7/2019
CN    106707363 B   10/2019

OTHER PUBLICATIONS

Viana, C.D., 2021, Multi-scale digital photogrammetry for acquisition of structural data [PHD thesis], São Paulo, Institute of Geosciences, University of São Paulo, 258 pages.

*Primary Examiner* — David T Welch
(74) *Attorney, Agent, or Firm* — STERNE, KESSLER, GOLDSTEIN & FOX P.L.L.C.

(57) ABSTRACT

The present invention relates to a method for reconstructing a Digital Outcrop Model (DOM), comprising placing an image acquisition device; capturing, processing and aligning a plurality of images; generating a sparse alignment cloud and performing its densification to generate a dense cloud; performing a first segmentation of the dense cloud into two portions based on two categories of geological relevance levels; carrying out decimation of the dense cloud portion of the low geological relevance category; joining the two portions of dense cloud; generating a three-dimensional triangular mesh; performing a second segmentation of the
(Continued)

three-dimensional triangular mesh into two portions based on two categories of geological relevance levels; carrying out decimation of the three-dimensional triangular mesh portions of the low and high geological relevance categories; carrying out texturing of the three-dimensional triangular mesh portions of the high and low geological relevance categories; and joining the two three-dimensional triangular mesh portions to form an object defined as DOM.

21 Claims, 1 Drawing Sheet

(51) Int. Cl.
    *G06T 7/10*      (2017.01)
    *G06V 10/24*    (2022.01)

(58) Field of Classification Search
    USPC .......................................................... 345/419
    See application file for complete search history.

(56) References Cited

U.S. PATENT DOCUMENTS

| | | | | |
|---|---|---|---|---|
| 2013/0144565 A1* | 6/2013 | Miller | .................... | G06T 17/20 703/1 |
| 2015/0081252 A1* | 3/2015 | Loss | ....................... | G06F 30/13 703/1 |
| 2015/0213572 A1* | 7/2015 | Loss | ....................... | G06T 15/04 345/420 |
| 2018/0188043 A1* | 7/2018 | Chen | ....................... | G06T 17/20 |
| 2019/0156507 A1* | 5/2019 | Zeng | ....................... | G06F 16/29 |
| 2019/0311502 A1* | 10/2019 | Mammou | ........... | G06F 16/9027 |
| 2020/0284590 A1* | 9/2020 | Chen | .................. | G01C 21/3841 |
| 2020/0314435 A1* | 10/2020 | Tourapis | ................... | G06T 7/74 |
| 2020/0364904 A1* | 11/2020 | Najaf-Zadeh | .............. | G06T 9/00 |
| 2020/0401817 A1* | 12/2020 | Schroeter | ................... | G06T 7/50 |
| 2021/0019937 A1* | 1/2021 | Gallaway | ................. | G06T 17/05 |
| 2021/0042845 A1* | 2/2021 | Plummer | ................. | G06F 30/20 |
| 2021/0063200 A1* | 3/2021 | Kroepfl | .............. | G01C 21/3867 |
| 2021/0097723 A1* | 4/2021 | Kim | ....................... | H04N 19/137 |
| 2021/0183068 A1* | 6/2021 | Li | ............................... | G06T 7/11 |
| 2021/0323572 A1* | 10/2021 | He | ............................ | G06T 3/14 |
| 2021/0327128 A1* | 10/2021 | Yu | ............................ | G06T 19/20 |
| 2021/0334988 A1* | 10/2021 | Xiao | ................... | G06F 18/2193 |
| 2021/0350147 A1* | 11/2021 | Yuan | ................. | G06F 18/23213 |
| 2021/0370968 A1* | 12/2021 | Xiao | ...................... | G01S 7/4808 |
| 2022/0377327 A1* | 11/2022 | Park | ...................... | H04N 19/167 |
| 2023/0146926 A1* | 5/2023 | Gorantla | ................... | G06T 7/70 701/450 |
| 2023/0368032 A1* | 11/2023 | Eckart | ....................... | G06N 3/09 |
| 2023/0368468 A1* | 11/2023 | Eckart | ................... | G06N 3/0495 |
| 2024/0013341 A1* | 1/2024 | Liu | ......................... | G06T 17/00 |
| 2025/0056049 A1* | 2/2025 | Denoual | ................ | H04N 19/46 |

* cited by examiner

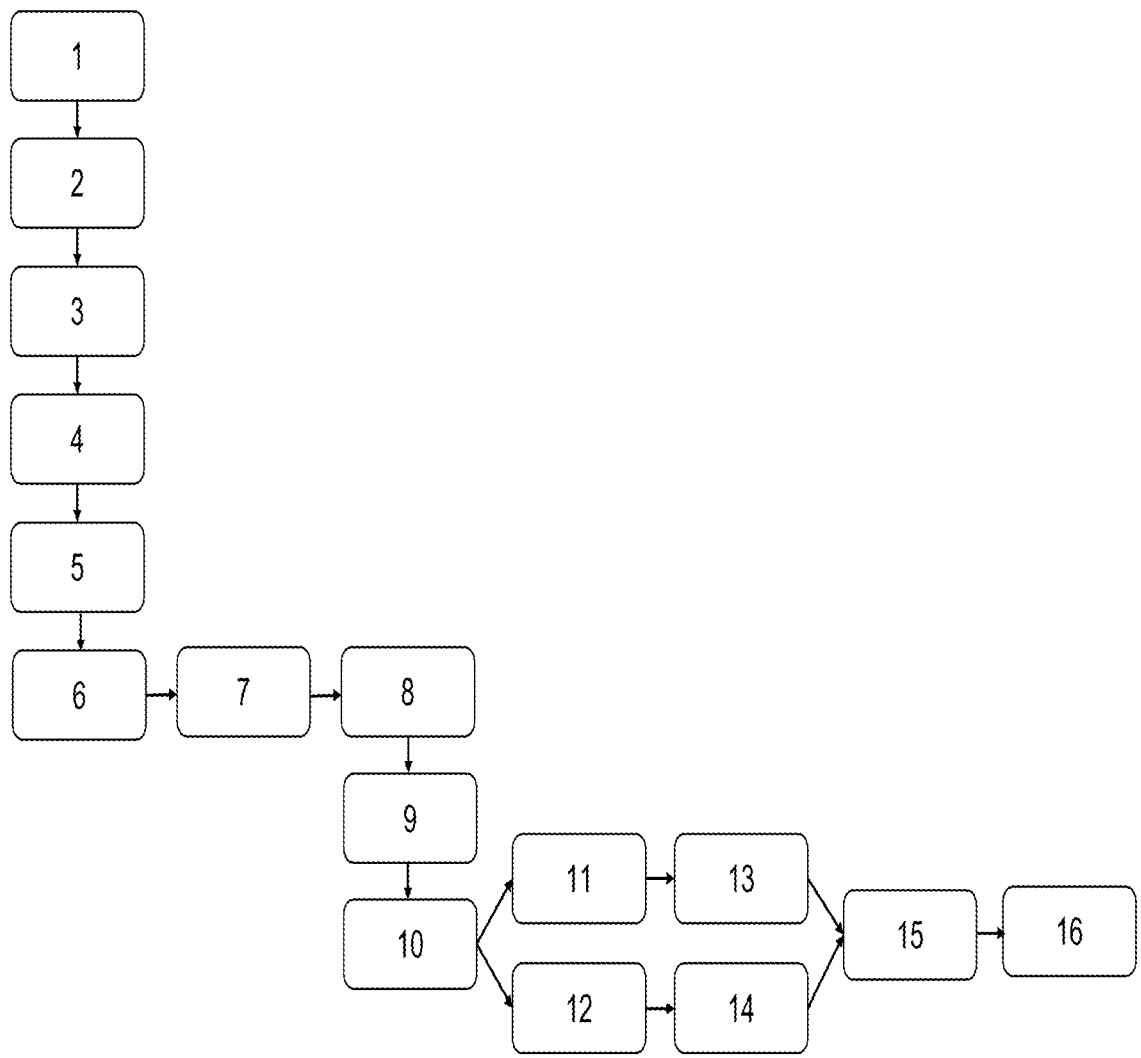

DIGITAL OUTCROP MODEL RECONSTRUCTING METHOD

FIELD OF THE INVENTION

The present invention falls within the technical field of geology and oil and gas exploration processes. More specifically, the present invention relates to a method of reconstruction of a Digital Outcrop Model (DOM).

BACKGROUND OF THE INVENTION

Construction of a Digital Outcrop Model (DOM) with high visual quality has become increasingly relevant since DOMs are used, for example, for assessing source rocks and oil and gas reservoirs.

With the popularization of image capture using Unmanned Aerial Vehicles (UAVs), the digital photogrammetry technique for reconstruction of DOMs became more widely used in the industrial and academic fields. Briefly, the digital photogrammetry technique refers to a method of obtaining images in the form of pixels from remote sensing.

However, such popularization shows several issues inherent to the application of this technique in a usual manner, without any technical knowledge of its by-products, which results in poorly optimized products, hence increasing the computational cost and restricting the visual quality of the DOMs to the machine parameter used in image processing.

Currently, in the state of the art, reconstruction of DOMs is carried out through pre-defined flows using existing software, which consist of the application of Structure for Motion (SfM) and Multi-View Stereo (MVS) algorithms on overlapping images, for the purpose of turning the point cloud into a dense cloud that is subjected to point interpolation to yield a triangular mesh.

Accordingly, the triangular mesh formed is integrally textured to generate UV maps of each model, in order to texture all the exposed geometry. More specifically, the UV map refers to a map of X, Y and Z coordinates of each pixel of the texture, to which a W axis is added, which indicates rotation of the position of the texture point, matching the mesh geometry.

This state-of-the-art method of reconstructing DOMs is semi-automated, but it is noted that failure to subject the triangular mesh to a segmentation and decimation process of the vertices combined with the lack of control over areas of geological interest yields low visual quality DOMs, since absence of these steps results in an excess of triangles in the triangular mesh geometry representation, leading to high costs for processing, storing and manipulating the data.

In view of the above, the DOM with low visual quality often becomes inoperable when in use since outcrops are commonly regions of large metric or even kilometric scales. Therefore, the use of conventional machines in the reconstruction of DOMs also becomes costly and has low performance.

Therefore, considering the faults in the existing method, there is a need for a method to optimize the results currently obtained, in order to provide a high visual quality DOM without the need to use powerful machines with robust Graphics Processing Unit (GPU) systems.

STATE OF THE ART

To solve the technical problems in the quality of Digital Outcrop Models (DOM), some methods have been reported.

Document CN110009740A discloses a three-dimensional geological outcrop reconstructing method based on a Motion Recovery Structure comprising a preliminary analysis of the outcrops, different styles of shooting for each geological target, dense cloud formation using the MVS algorithm, construction of a triangle mesh by Poisson reconstruction and obtaining a three-dimensional geological model.

Furthermore, the document by Viana, C. D., 2021, Multi-scale digital photogrammetry for acquisition of structural data [PHD thesis], São Paulo, Institute of Geosciences, University of São Paulo, 258 pages, discloses a study of the application of SfM-MVS algorithms in the investigation of fractured media in the 3D model. For this analysis, digital models of different outcrops were generated using sets of images at different scales, captured by different cameras and subsequent investigation of the reconstruction quality levels offered by the Agisoft Metashape software.

Similarly, patent document CN106707363B refers to a method and a system for determining a three-dimensional digital outcrop geological model that is intended to improve the reliability of determining the DOM by dividing the outcrop into areas and using different groups of pre-selected equipment for capturing images of each area of the outcrop as divided.

Therefore, it can be concluded that the state of the art describes methods and systems that propose different ways of reconstructing a three-dimensional Digital Outcrop Model. Thus, methods are proposed that involve analyses of outcrops, different image capture styles for varied geological targets, steps of aligning and processing image using SfM-MVS algorithms and the Agisoft Metashape software. However, the disclosed methods do not suggest controlling the different levels of geological interest of the outcrops, subjecting each of these levels to different processing and decimating the vertices of the triangle mesh thus formed.

Therefore, the prior art methods only generate DOMs having a visual quality dependent on the parameters of the machine used to process the images.

Accordingly, the present invention discloses a method that allows the user to intervene in specific steps and by-products of the DOM, which includes segmentation by area of geological interest and control of the number of points and vertices to be generated in the triangular mesh, in order to optimize the results to obtain high visual quality DOMs without the need to use powerful machines with robust Graphics Processing Unit (GPU) systems.

BRIEF DESCRIPTION OF THE INVENTION

The present invention defines, according to a preferred embodiment, a method for reconstruction of a Digital Outcrop Model (DOM), the method comprising:
  placing at least one image acquisition device for each image of a plurality of images to be captured;
  capturing the plurality of images;
  processing pairs of captured images;
  aligning the plurality of images by identifying a plurality of homologous points between them;
  generating at least one alignment sparse cloud;
  performing densification of the at least one alignment sparse cloud to transform the at least one sparse cloud into at least one dense cloud;
  performing a first segmentation of at least one dense cloud into at least two dense cloud portions, based on at least two categories of geological relevance levels, wherein the at least two categories of geological relevance levels comprise a high geological relevance category and a low geological relevance category;

carrying out a first decimation of at least one dense cloud portion in the low geological relevance category;

joining the at least two dense cloud portions and obtaining at least one new dense cloud, wherein the at least two dense cloud portions comprise at least one dense cloud portion of the high geological relevance category and at least one dense cloud portion of the low geological relevance category, wherein the at least one portion of the dense cloud of the low geological relevance category has undergone the step of carrying out a first decimation;

generating at least one three-dimensional triangular mesh of at least one new dense cloud;

performing a second segmentation of the three-dimensional triangular mesh into at least two three-dimensional triangular mesh portions, based on at least two categories of geological relevance levels, wherein the at least two categories of geological relevance levels comprise a high geological relevance category and a low geological relevance category;

carrying out a second decimation of at least one portion of a three-dimensional triangular mesh in the low geological relevance category;

performing a third decimation of at least one portion of a three-dimensional triangular mesh in the high geological relevance category;

carrying out a first texturing of at least one portion of a three-dimensional triangular mesh in the high geological relevance category, which has undergone the step of carrying out a third decimation;

carrying out a second texturing of at least one portion of a three-dimensional triangular mesh in the low geological relevance category, which has undergone the step of carrying out a second decimation; and joining the at least two three-dimensional triangular mesh portions, wherein the at least two three-dimensional triangular mesh portions comprise the at least one three-dimensional triangular mesh portion of the high geological relevance category and the at least one three-dimensional triangular mesh portion of the low geological relevance category, which have been textured, and forming at least one object comprising at least one Digital Outcrop Model (DOM).

The Digital Outcrop Model reconstructing method according to the present invention exhibits some technical and economic advantages related to:

Applicability in varied scenarios of outcropping rocks, from kilometric complexes to tiny outcrops. In this instance, the limitations for carrying out the reconstruction are only of a physical, such as access to the outcrop, level of exposure and quality of the rocks;

Reduction of up to 70% in the size of generated files, which leads to an optimization of the performance of the used software and facilitates the storage of data on physical or non-physical media;

Possibility of using computational machines of different setting, as it requires less storage space, less graphic capacity and less processing capacity for handling the DOM at high performance, hence, resulting in an increased ability of expert professionals in the field to produce and interpret geological data;

Reduction in the costs of modeling processes by allowing execution on less robust machines, as described in the previous item, and the use of open-source software.

BRIEF DESCRIPTION OF THE FIGURES

In order to complement the present description and provide a better understanding of the features of the present invention, and in accordance with a preferred embodiment of the present invention, a FIGURE is attached herein, which in an exemplary, although not limiting, manner represents the preferred embodiment of the present invention.

FIG. 1 illustrates a flowchart of the steps of the Digital Outcrop Model reconstructing method according to a preferred embodiment of the present invention.

DETAILED DESCRIPTION OF THE INVENTION

The method for reconstructing a Digital Outcrop Model according to a preferred embodiment of the present invention is described in detail based on the attached FIGURE.

FIG. 1 illustrates a flowchart of the steps of the Digital Outcrop Model (DOM) reconstructing method according to a preferred embodiment of the present invention.

According to FIG. 1, the Digital Outcrop Model (DOM) reconstructing method comprises the steps of:

placing 1 at least one image acquisition device for each image of a plurality of images to be captured;

capturing 2 the plurality of images;

aligning 3 a plurality of images by identifying a plurality of homologous points between them;

generating 4 at least one alignment sparse cloud;

performing densification 5 of the at least one alignment sparse cloud to transform the at least one sparse cloud into at least one dense cloud;

performing a first segmentation 6 of at least one dense cloud into at least two dense cloud portions, based on at least two categories of geological relevance levels, wherein the at least two categories of geological relevance levels may comprise a high geological relevance category and a low geological relevance category.

Regarding the plurality of homologous points, their quantity will be dependent on their morphology. In particular, a range of around 50% to around 60% reduction in the size of meshes and clouds can be defined, more specifically, in some instances the reduction reaches about 70%.

Furthermore, the Digital Outcrop Model reconstructing method further comprises:

carrying out a first decimation 7 of at least one dense cloud portion in the low geological relevance category;

joining 8 the at least two dense cloud portions and obtaining at least one new dense cloud, wherein the at least two dense cloud portions may comprise at least one dense cloud portion of the high geological relevance category and at least one dense cloud portion of the low geological relevance category, wherein at least a portion of the dense cloud of the low geological relevance category has undergone the step of carrying out a first decimation 7;

generating 9 at least one three-dimensional (3D) triangular mesh of at least one new dense cloud;

performing a second segmentation 10 of the at least one three-dimensional triangular mesh into at least two three-dimensional triangular mesh portions, based on at least two categories of geological relevance levels, wherein the at least two categories of geological relevance levels may comprise a high geological relevance category and a low geological relevance category.

The Digital Outcrop Model reconstructing method further comprises:
- carrying out a second decimation 11 of at least one portion of a three-dimensional triangular mesh in the low geological relevance category;
- performing a third decimation 12 of at least one portion of a three-dimensional triangular mesh in the high geological relevance category;
- carrying out a first texturing 13 of at least one portion of a three-dimensional triangular mesh in the high geological relevance category, which has undergone the step of carrying out a third decimation 12;
- carrying out a second texturing 14 of at least one portion of a three-dimensional triangular mesh in the low geological relevance category, which has undergone the step of carrying out a second decimation 11; and
- joining 15 the at least two three-dimensional triangular mesh portions, wherein the at least two three-dimensional triangular mesh portions may comprise the at least one three-dimensional triangular mesh portion of the high geological relevance category and the at least one three-dimensional triangular mesh portion of the low geological relevance category, which have been textured, and forming at least one object comprising at least one Digital Outcrop Model (DOM);
- exporting 16 the at least one DOM in at least one file format and the textures of at least one DOM in at least one graphic format, with their respective coordinate and projection systems preserved.

Specifically, the at least one image acquisition device may be at least one camera, wherein the camera may be any camera that is suitable for the design conditions of a particular application.

According to a preferred embodiment of the present invention, the step of performing a densification 5 of at least one sparse alignment cloud to transform the at least one sparse cloud into at least one dense cloud may be performed, preferably, through the Multi-View Stereo (MVS) Algorithm, wherein the MVS algorithm decomposes the plurality of images individually and subsequently joins the plurality of decomposed images to form at least one dense cloud.

Furthermore, according to another preferred embodiment of the present invention, the at least two categories of geological relevance levels comprised in the step of performing the first segmentation 6 of at least one dense cloud into at least two dense cloud portions can be defined, preferably, by one or more of the following options: at least one user, at least one software, at least one set of computer-readable instructions or at least one machine learning tool.

Thus, according to a preferred embodiment of the present invention, the at least one dense cloud portion of the high geological relevance category obtained in the step of carrying out a first segmentation 6 of at least one dense cloud into at least two dense cloud portions, predominantly comprises, for example, vertical features of the outcrop, including or more of: geometric structures, walls, structural features and in situ blocks, for example.

In turn, the at least one dense cloud portion of the low geological relevance category obtained in the step of carrying out a first segmentation 6 of at least one dense cloud into at least two dense cloud portions, predominantly comprises, for example, horizontal features of the outcrop, including or more of: unconsolidated sediments, areas of motion of the blocks, vegetations strips and bodies of water, for example.

Specifically, according to a preferred embodiment, the step of performing a first decimation 7 of at least one dense cloud portion of the low geological relevance category comprises resampling the points of at least one dense cloud portion of the low geological relevance category, wherein when resampling at least one dense cloud portion from the low geological relevance category an equidistance of, preferably, at least 1 meter can be defined between the points of at least one dense cloud portion from the low geological relevance category and, further, the edges of at least one dense cloud portion from the low geological relevance category are preserved.

Furthermore, according to a preferred embodiment of the present invention, the step of generating 9 at least one three-dimensional triangular mesh can be performed, preferably, by the Agisoft Metashape software, by interpolating the plurality of points of at least one dense cloud formed by joining the at least two dense cloud portions carried out in the step of joining 8 the at least two dense cloud portions, wherein the interpolation can be preferably performed through the triangulation method.

In particular, according to a preferred embodiment of the present invention, the step of performing a second segmentation 10 of at least one three-dimensional triangular mesh into at least two three-dimensional triangular mesh portions based on at least two categories of geological relevance levels already further includes at least one dense cloud portion from the low geological relevance category in addition to at least one dense cloud portion from the low geological relevance category, which has undergone the decimation step 7.

Furthermore, according to a preferred embodiment of the present invention, the at least two categories of geological relevance levels comprised in the step of performing a second segmentation 10 of the three-dimensional triangular mesh into at least two three-dimensional triangular mesh portions, can be defined, preferably, by one or more of the following options: at least one user, at least one software, at least one computer-readable instruction assembly, or at least one machine learning tool.

Thus, according to a preferred embodiment of the present invention, the at least one portion of a three-dimensional triangular mesh of the low geological relevance category obtained in the step of carrying out a second segmentation 10 of the three-dimensional triangular mesh into at least two three-dimensional triangular mesh portions predominantly comprises horizontal features of the outcrop, including one or more of: unconsolidated sediments, areas of motion of the blocks, vegetation strips and bodies of water, for example.

In turn, the at least one three-dimensional triangular mesh portion of the high geological relevance category obtained in the step of performing a second segmentation 10 of the three-dimensional triangular mesh into at least two three-dimensional triangular mesh portions predominantly comprises vertical features of the outcrop, including one or more of: geometric structures, structural features, walls and in situ blocks.

Furthermore, according to a preferred embodiment of the present invention, the step of performing a second decimation 11 of at least one portion of a three-dimensional triangular mesh of the low geological relevance category comprises subjecting at least one portion of a three-dimensional triangular mesh of the low geological relevance category to a decimation by quadratic collapse of the vertices, with a reduction of preferably up to 90% of the final number of vertices and faces of at least one portion of a three-dimensional triangular mesh in the low geological relevance category, preserving the topology, the orientation of the normal lines and the squared error optimization.

Thereafter, according to a preferred embodiment of the present invention, the step of performing a third decimation 12 of at least one portion of a three-dimensional triangular mesh of the high geological relevance category comprises subjecting at least one portion of a three-dimensional triangular mesh of the high geological relevance category to a decimation by quadratic collapse of the vertices, with a reduction of preferably up to 40% of the final number of vertices and faces of at least one portion of a three-dimensional triangular mesh in the high geological relevance category, preserving the topology, the orientation of the normal lines and the squared error optimization.

Moreover, according to a preferred embodiment of the present invention, the step of carrying out a first texturing 13 of at least a portion of a three-dimensional triangular mesh of the high geological relevance category can be performed, preferably, within the Agisoft Metashape software, resulting in an optimized texture distribution, wherein to achieve this result two or more texture files are generated at a resolution of, preferably, 8 k pixels (8,182 pixels), which is likely to require higher resolutions for very extensive outcrops.

While the step of performing a second texturing 14 of at least a portion of the three-dimensional triangular mesh of the low geological relevance category may also be performed, preferably, in the Agisoft Metashape software, resulting in an optimized distribution of the texture, whereby to achieve this result, preferably, a texture file at a resolution of, preferably, at most 4 k pixels (4,096 pixels) is generated, which is not likely to require a greater number of texture files or higher resolutions of texture files, since the at least one portion of the three-dimensional triangular mesh in the low geological relevance category has the sole function of contextualizing the DOM, with no need for highly reliable representations of the geometry.

Also, the method of the present invention, according to a preferred embodiment thereof, includes, after the steps of performing a first texturing 13 and performing a second texturing, the step of joining 15 the at least two three-dimensional triangular mesh portions, which comprises preserving the edges of each of at least two three-dimensional triangular mesh portions, wherein preserving the edges prevents problems during the joining process. Particularly, the joining step 15 includes compiling the at least two three-dimensional triangular mesh portions to form a single object; however the textures of each of the at least two three-dimensional triangular mesh portions remain individualized and with their respective sizes and positions on the UV map preserved.

More specifically, the UV map refers to a map of X, Y and Z coordinates of each pixel of the texture, to which a W axis is added, which indicates rotation of the position of the texture point, matching the mesh geometry.

Furthermore, according to a preferred embodiment of the invention, in the step of exporting 16 the at least one DOM in at least one file format and the textures of at least one DOM in at least one graphic format, wherein the at least one DOM has its respective coordinate and projection systems preserved, the at least one DOM is, preferably, exported as .obj and the DOM textures are preferably exported as .jpeg.

Those skilled in the art will value the knowledge presented herein and may reproduce the invention in the disclosed embodiments and other variants, as covered by the scope of the appended claims.

The invention claimed is:

1. A Digital Outcrop Model (DOM) reconstructing method, comprising:
   placing at least one image acquisition device for each image of a plurality of images to be captured;
   capturing the plurality of images;
   processing pairs of captured images;
   aligning the plurality of images by identifying a plurality of homologous points between them;
   generating at least one alignment sparse cloud;
   performing densification of the at least one alignment sparse cloud to transform the at least one sparse cloud into at least one dense cloud;
   performing a first segmentation of at least one dense cloud into at least two dense cloud portions, based on at least two categories of geological relevance levels, wherein the at least two categories of geological relevance levels comprise a high geological relevance category and a low geological relevance category;
   carrying out a first decimation of at least one dense cloud portion in the low geological relevance category;
   joining the at least two dense cloud portions and obtaining at least one new dense cloud, wherein the at least two dense cloud portions comprise at least one dense cloud portion of the high geological relevance category and at least one dense cloud portion of the low geological relevance category, wherein at least one dense cloud portion of the low geological relevance category has undergone the step of carrying out a first decimation;
   generating at least one three-dimensional triangular mesh from at least one new dense cloud;
   performing a second segmentation of the three-dimensional triangular mesh into at least two three-dimensional triangular mesh portions, based on at least two categories of geological relevance levels, wherein the at least two categories of geological relevance levels comprise a high geological relevance category and a low geological relevance category;
   carrying out a second decimation of at least one portion of a three-dimensional triangular mesh in the low geological relevance category;
   performing a third decimation of at least one portion of a three-dimensional triangular mesh in the high geological relevance category;
   carrying out a first texturing of at least one portion of a three-dimensional triangular mesh in the high geological relevance category, which has undergone the step of carrying out a third decimation;
   carrying out a second texturing of at least one portion of a three-dimensional triangular mesh in the low geological relevance category, which has undergone the step of carrying out a second decimation; and
   joining the at least two three-dimensional triangular mesh portions, wherein the at least two three-dimensional triangular mesh portions comprise the at least one three-dimensional triangular mesh portion of the high geological relevance category and the at least one three-dimensional triangular mesh portion of the low geological relevance category, which have been textured, and forming at least one object comprising at least one Digital Outcrop Model (DOM).

2. The method of claim 1, further comprising exporting the at least one DOM in at least one file format and the textures of at least one DOM in at least one graphic format.

3. The method of claim 1, wherein the at least one image acquisition device may be at least one camera.

4. The method of claim 1, wherein the step of performing a densification of at least one sparse alignment cloud to transform the at least one sparse cloud into at least one dense cloud may be performed through the Multi-View Stereo (MVS) Algorithm, wherein the MVS algorithm decomposes the plurality of images individually and subsequently joins the plurality of decomposed images to form the at least one dense cloud.

5. The method of claim 1, wherein the at least two categories per level of geological relevance, which serve as a basis for the step of carrying out a first segmentation of at least one dense cloud into at least two dense cloud portions, are defined by one or more of: at least one user, at least one computer-readable instruction assembly, or at least one machine learning tool.

6. The method of claim 1, wherein the at least one dense cloud portion of the high geological relevance category obtained in the step of carrying out a first segmentation of at least one dense cloud into at least two dense cloud portions comprises, predominantly, vertical features of the outcrop including or more of: geometric structures, structural features, walls, or in situ blocks.

7. The method of claim 1, wherein the at least one dense cloud portion of the high geological relevance category obtained in the step of carrying out a first segmentation of at least one dense cloud into at least two dense cloud portions, predominantly comprises horizontal features of the outcrop, including one or more of: unconsolidated areas of motion of the blocks, vegetation strips, or bodies of water.

8. The method of claim 1, wherein the step of carrying out a first decimation of at least one dense cloud portion from the low geological relevance category comprises resampling the points of at least one dense cloud portion from the low geological relevance category, wherein when re-sampling at least one dense cloud portion from the low geological relevance category, an equidistance of 1 m is defined between the points of at least one dense cloud portion from the low geological relevance category.

9. The method of claim 6, wherein when resampling at least one dense cloud portion from the low geological relevance category, the edges of at least one dense cloud portion from the low geological relevance category are preserved.

10. The method of claim 1, wherein the step of generating at least one three-dimensional triangular mesh of at least one new dense cloud is carried out by interpolating the plurality of points of at least one new dense cloud formed in the step of joining the at least two dense cloud portions, wherein interpolation is carried out using the triangulation method.

11. The method of claim 8, wherein the step of generating at least one three-dimensional triangular mesh of at least one new dense cloud is performed by the Agisoft Metashape software.

12. The method of claim 1, wherein the at least two categories of geological relevance levels, which serve as the basis for the step of carrying out a second segmentation of the three-dimensional triangular mesh into at least two three-dimensional triangular mesh portions, are defined by one or more of: at least one user, at least one computer-readable instruction assembly, or at least one machine learning tool.

13. The method of claim 1, wherein the at least one three-dimensional triangular mesh portion of the high geological relevance category, obtained in the step of carrying out a second segmentation of the three-dimensional triangular mesh into at least two three-dimensional triangular mesh portions predominantly comprises vertical features of the outcrop including or more of: geometric structures, structural features, walls, or in situ blocks.

14. The method of claim 1, wherein the at least one three-dimensional triangular mesh portion of the low geological relevance category, obtained in the step of carrying out a second segmentation of the three-dimensional triangular mesh into at least two three-dimensional triangular mesh portions predominantly comprises horizontal features of the outcrop including one or more of: unconsolidated sediments, areas of motion of the blocks, vegetation strips, or bodies of water.

15. The method of claim 1, wherein the step of performing a second decimation of at least one portion of a three-dimensional triangular mesh of the low geological relevance category comprises subjecting at least one portion of a three-dimensional triangular mesh of the low geological relevance category to a decimation by quadratic collapse of the vertices, with a reduction of up to 90% of the final number of vertices and faces of at least one portion of a three-dimensional triangular mesh in the low geological relevance category,
wherein the topology, the orientation of the normal lines, and the squared error optimization are preserved.

16. The method of claim 1, wherein the step of performing a third decimation of at least one portion of a three-dimensional triangular mesh of the high geological relevance category comprises subjecting at least one portion of a three-dimensional triangular mesh of the high geological relevance category to a decimation by quadratic collapse of the vertices, with a reduction of up to 40% of the final number of vertices and faces of at least one portion of a three-dimensional triangular mesh in the high geological relevance category,
wherein the topology, the orientation of the normal lines, and the squared error optimization are preserved.

17. The method of claim 1, wherein either of the steps of carrying out a first texturing of at least a portion of a three-dimensional triangular mesh of the high geological relevance category or of the step of carrying out a second texturing of at least a portion of a triangular mesh three-dimensional structure of the low geological relevance category is performed within the Agisoft Metashape software.

18. The method of claim 1, wherein the step of joining the at least two three-dimensional triangular mesh portions comprises preserving the edges of each of the at least two three-dimensional triangular mesh portions.

19. The method of claim 1, wherein the step of joining the at least two three-dimensional triangular mesh portions comprises preserving the textures of each of the at least two three-dimensional triangular mesh portions are preserved including their respective sizes and positions on the UV map.

20. The method of claim 2, wherein in the step of exporting the at least one DOM in at least one file format and the textures of at least one DOM in at least one graphic format, wherein the at least one DOM is exported in as .obj, and wherein the DOM textures are exported as .jpeg.

21. The method of claim 2, wherein in the step of exporting the at least one DOM in at least one file format and the textures of at least one DOM in at least one graphic format, at least one DOM has its respective coordinate and projection systems preserved.

* * * * *